United States Patent
Wolczko et al.

(10) Patent No.: US 8,825,718 B2
(45) Date of Patent: Sep. 2, 2014

(54) METHODS AND APPARATUS FOR MARKING OBJECTS FOR GARBAGE COLLECTION IN AN OBJECT-BASED MEMORY SYSTEM

(75) Inventors: Mario Wolczko, San Carlos, CA (US); Gregory Wright, Mountain View, CA (US); Matthew Seidl, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 462 days.

(21) Appl. No.: 11/648,135

(22) Filed: Dec. 28, 2006

(65) Prior Publication Data
US 2008/0162611 A1 Jul. 3, 2008

(51) Int. Cl.
*G06F 17/30* (2006.01)

(52) U.S. Cl.
USPC .......................................... 707/813; 707/815

(58) Field of Classification Search
USPC ................................................. 707/813, 815
See application file for complete search history.

(56) References Cited

U.S. PATENT DOCUMENTS

| | | | |
|---|---|---|---|
| 5,943,692 A * | 8/1999 | Marberg et al. | 711/203 |
| 6,308,185 B1 * | 10/2001 | Grarup et al. | 1/1 |
| 2001/0023478 A1 * | 9/2001 | Ozawa et al. | 711/170 |
| 2003/0140071 A1 * | 7/2003 | Kawamoto | 707/206 |
| 2003/0200392 A1 * | 10/2003 | Wright et al. | 711/118 |
| 2007/0016634 A1 * | 1/2007 | Sekiguchi et al. | 707/206 |
| 2007/0100919 A1 * | 5/2007 | Lee et al. | 707/206 |
| 2007/0150868 A1 * | 6/2007 | Wu et al. | 717/124 |

* cited by examiner

*Primary Examiner* — Kim Nguyen
(74) *Attorney, Agent, or Firm* — Brooks Kushman P.C.

(57) ABSTRACT

A garbage collection process performs garbage collection operations in an object-based memory system associated with a processing environment. The garbage collection process receives, at a first garbage collection unit, object references derived from root data from a processor associated with the first garbage collection unit. In addition, the garbage collection process processes, at the first garbage collection unit, the root data received from the processor associated with the first garbage collection unit. The garbage collection process also determines which object references derived from the root data are associated with a second garbage collection unit. Upon determining that an object reference is associated with a second garbage collection unit, the garbage collection process communicates information representative of the object reference to the second garbage collection unit associated with the object reference.

18 Claims, 9 Drawing Sheets

204
PROCESS, AT THE FIRST GARBAGE COLLECTION UNIT, OBJECT REFERENCES DERIVED FROM THE ROOT DATA RECEIVED FROM THE PROCESSOR ASSOCIATED WITH THE FIRST GARBAGE COLLECTION UNIT

250
IDENTIFY OBJECT REFERENCES WITHIN AN OBJECT USING A BIFURCATED DATA STRUCTURE, WHEREIN THE HEADER DATA IS APPROXIMATELY LOCATED IN THE MIDDLE OF THE OBJECT, OBJECT REFERENCE DATA ARE LOCATED AT NEGATIVE OFFSETS TO THE HEADER DATA, AND NON-REFERENCE DATA ARE LOCATED AT POSITIVE OFFSETS TO THE HEADER DATA

AND/OR

251
IDENTIFY OBJECT REFERENCES WITHIN AN OBJECT USING A BIFURCATED DATA STRUCTURE, WHEREIN THE HEADER DATA IS APPROXIMATELY LOCATED IN THE MIDDLE OF THE OBJECT, OBJECT REFERENCE DATA ARE LOCATED AT POSITIVE OFFSETS TO THE HEADER DATA, AND NON-REFERENCE DATA ARE LOCATED AT NEGATIVE OFFSETS TO THE HEADER DATA

AND/OR

252
IDENTIFY OBJECT REFERENCES WITHIN AN OBJECT USING A TAGGED MEMORY DATA STRUCTURE

AND/OR

253
FROM EACH OBJECT REFERENCE, DERIVE FURTHER OBJECT REFERENCES BY IDENTIFYING OBJECT REFERENCES WITHIN THE CONTENTS OF THE REFERENCED OBJECTS

*FIG. 9*

METHODS AND APPARATUS FOR MARKING OBJECTS FOR GARBAGE COLLECTION IN AN OBJECT-BASED MEMORY SYSTEM

BACKGROUND

One feature of object oriented programming (e.g., using Java) is its garbage-collected heap, which takes care of freeing dynamically allocated memory that is no longer referenced. For example, the Java Virtual Machine's (JVM's) heap stores all objects created by an executing Java program. Objects are created by Java's "new" operator, and memory for new objects is allocated on the heap at run time.

Garbage Collection is the process of automatically freeing objects that are no longer referenced by the program. This frees the programmer from having to keep track of when to free allocated memory, thereby preventing many potential bugs. When an object is no longer referenced by the program, the heap space it occupies must be recycled so that the space is available for subsequent new objects. The garbage collector must determine which objects are no longer referenced by the program and make available the heap space occupied by such unreferenced objects (e.g., free the unreferenced objects). In addition to freeing unreferenced objects, a garbage collector may also combat heap fragmentation. Heap fragmentation occurs through the course of normal program execution. New objects are allocated, and unreferenced objects are freed such that free blocks of heap memory are left in between blocks occupied by live objects. Requests to allocate new objects may have to be filled by extending the size of the heap even though there is enough total unused space in the existing heap. This will happen if there is not enough contiguous free heap space available into which the new object will fit. On a virtual memory system, the extra paging required to service an ever-growing heap can degrade the performance of the executing program.

A potential disadvantage of a garbage-collected heap is that it adds an overhead that can affect program performance. For example, the JVM has to keep track of which objects are being referenced by the executing program, and finalize and free unreferenced objects on the fly. This activity will likely require more central processing unit (CPU) time than would have been required if the program explicitly freed unnecessary memory. In addition, programmers in a garbage-collected environment have less control over the scheduling of CPU time devoted to freeing objects that are no longer needed.

A garbage collector performs several tasks. These tasks may included, for example, detecting garbage objects, reclaiming the heap space used by the garbage objects, and then making this space available to the program. Garbage detection is ordinarily accomplished by defining a set of roots and determining reachability from the roots. An object is reachable if there is some path of references from the roots by which the executing program can access the object. The roots are accessible to the program. Any objects that are reachable from the roots are considered live. Objects that are not reachable are considered garbage, because they can no longer affect the future course of program execution.

The heap also maintains a pointer which will indicate where the next object is to be allocated within the heap. Initially, the pointer is set to the base address of the reserved address region. When a new object is created with the new operator it will make sure that the bytes required for the new object are available on heap. The heap detects this by adding the size of the new object to heap pointer. If a pointer is beyond the end of the address space region, then the heap is full and a collection must be performed.

When a garbage collector begins a garbage collection cycle, it is unknown which objects in the heap are garbage objects. The garbage collector starts traversing the roots and building a graph of all objects reachable from the roots. Once all the roots have been checked, the garbage collector's graph contains the set of all objects that are somehow reachable from the application's roots. Any objects that are not in the graph are not accessible by the application, and are therefore considered garbage.

Garbage collectors that move objects concurrently with a mutator thread (e.g., a thread that performs application processing, as distinct from garbage collection) require a read barrier to ensure that a mutator thread cannot obtain object references that are unknown to the garbage collector. There are several ways of employing a read barrier: either by adding inline instructions, use of dedicated read-barrier assist logic in the processor, or by leveraging the operating system's existing memory protection mechanisms.

SUMMARY

Conventional garbage collection systems suffer from a variety of deficiencies. More specifically, conventional garbage collection systems perform marking operations by finding all live objects, recursively following object references starting from a root set. In conventional garbage collection systems, since each object is visited once by a garbage collection process, the benefits of caching are substantially negated. For example, in a conventional garbage collection system each cache line of each live object is fetched into cache, the object references are then each inspected by the garbage collection process, and the mark bit (typically in the first cache line of the object) is set once. At some later time, due to cache pressure, the modified cache line containing the mark bit is then written back out to memory, often being displaced one cache level at a time. Furthermore, in a conventional multiprocessor system, numerous coherence messages are sent to accomplish the following tasks: a) fetching the cache line to request a readable copy; b) asserting ownership when inverting the mark bit; and c) performing a writeback to memory. In a system with multi-level caches and inclusion, multiple copies of the same cache line are deposited in different levels of the cache, resulting in a degradation of system performance and more power consumption.

Accordingly, example configurations described herein substantially overcome the shortcomings presented by providing a garbage collection process instantiated in one or more garbage collection units in an object-based memory system. Typically, the garbage collection units are logically located between processor cache memory and the system memory (e.g., DRAM), and alongside an object ID-to-physical address translator. In this manner, the garbage collection units perform garbage collection marking operations within the heap. To operate autonomously (once passed one or more roots from a central processing unit "CPU"), a garbage collection unit finds references and the corresponding objects that are referenced (e.g., via various object reference traversal algorithms commonly known in the art) and, in turn, the garbage collection unit processes a mark bit for each object. Furthermore, each garbage collection unit has the responsibility of traversing and marking the objects in the particular memory (e.g., DRAM) controlled by the respective garbage collection unit, and then communicating live object references to other garbage collection units in the computing system if necessary. To coordinate a garbage collection unit's actions with a mutator thread, a state bit is added to each cache line and mutator thread. Read and write barriers in the CPUs and translators act upon the given state of the cache line and mutator thread state bit.

In accordance with embodiments disclosed herein, a garbage collection process receives, at a first garbage collection unit, root data from a processor associated with the first garbage collection unit. In one example embodiment, the garbage collection unit is adapted to be executed in a memory controller associated with the processing environment. In another example embodiment, the garbage collection unit is adapted to be executed in an active memory buffer associated with the processing environment. In yet another example embodiment, the garbage collection unit is adapted to be executed in random access memory associated with the processing environment. Additionally, the garbage collection process processes, at the first garbage collection unit, object references derived from the root data received from the processor associated with the first garbage collection unit.

The garbage collection process also determines which object references derived from the root data are associated with a second garbage collection unit. Upon determining that an object reference is associated with a second garbage collection unit, the garbage collection process communicates information representative of the object reference to the second garbage collection unit associated with the object reference.

In another example embodiment, the garbage collection process identifies read and write barrier information from a state bit associated with at least one mutator thread and with at least one cache line. In this manner, the state bit represents either a clean or a dirty state, wherein the state bit is set to the dirty state upon initiation of a garbage collection cycle for each mutator thread. Furthermore, the garbage collection process activates a read barrier in the processor during traversal of the live objects at the first garbage collection unit. The read barrier is operable to prevent incorrect read operations from a cache line to a mutator thread. In operation, the garbage collection process activates the read barrier when a mutator thread having a clean state bit attempts to read information from a cache line having a dirty state bit. Upon activating the read barrier, the garbage collection process writes the cache line having a dirty state bit to memory. The garbage collection process also sends the object references associated with the cache line to the garbage collection unit for marking in accordance with an example embodiment. Moreover, as in one example embodiment, the garbage collection process changes the state of the cache line from a dirty state to a clean state. Upon changing the state of the cache line from dirty to clean, the read operation may then proceed.

In yet another example embodiment, the garbage collection process activates a write barrier in the processor during traversal of the live objects at the garbage collection unit. The write barrier is operable to prevent incorrect write operations from a mutator thread to a cache line. In operation, the garbage collection process activates the write barrier when a mutator thread having a dirty state bit attempts to write information to a cache line having a clean state bit. Upon activating the write barrier, the garbage collection process logs (e.g., records) the write attempt in the mutator thread. Additionally, as in one example embodiment, the garbage collection process processes, at the first garbage collection unit, the logged write attempt of the mutator thread to the clean cache line.

In still yet another embodiment described herein, after sending information associated with the registers and stack of a mutator thread to the garbage collection unit, the garbage collection process changes the mutator thread state bit from a dirty state to a clean state. Furthermore, the garbage collection process identifies read and write barrier information from a state bit associated with at least one object reference in accordance with one example embodiment. The garbage collection process also identifies read and write barrier information from a state bit associated with at least one page in a paged memory structure in another example embodiment.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein also include software programs, in part, to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems Inc. of Santa Clara, Calif., USA.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a flow chart of processing steps that shows high-level processing operations performed by the garbage collection process while the garbage collection process is processing root data and identifying live objects in accordance with one example embodiment.

DETAILED DESCRIPTION

Figure 1:
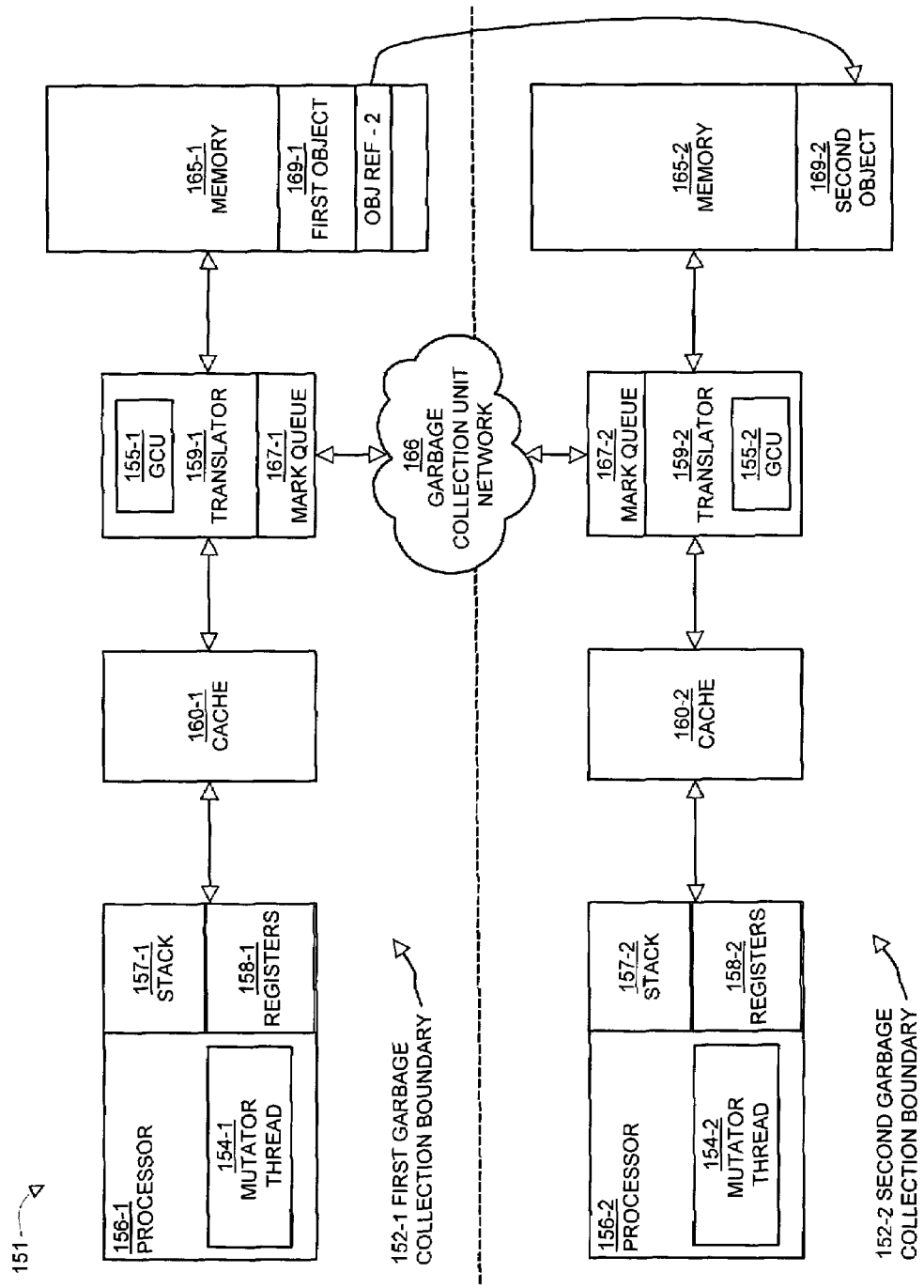
FIG. 1 is a block diagram illustrating an example architecture of a processing environment having multiple garbage collection units in accordance with one example embodiment.

FIG. 1 is a block diagram illustrating an example architecture of a processing environment 151 having multiple garbage collection units 155 (e.g., garbage collection units 155-1 and 155-2). The processing environment 151 is logically divided into a first garbage collection boundary 152-1 and a second garbage collection boundary 152-2. Each garbage collection boundary 152 comprises a processor 156 with a stack 157 and registers 158 for executing mutator threads 154. Cache 160-1 and cache 160-2 are in communication with processor 156-1 and processor 156-2, respectively. Furthermore, caches 160-1, 160-2 are in communication with translators 159-1 and 159-2, respectively (e.g., object ID-to-physical address translators). In this example embodiment, garbage collection units ("GCUs") 155-1 and 155-2 are instantiated in the respective translators 159-1 and 159-2. The translators 159 (and garbage collection units 155) provide an interface between the last cache level (cache 160 in this example embodiment) and the system memory 165 (e.g., DRAM). Furthermore, garbage collection unit 155-1 is in communication with garbage collection unit 155-2 via garbage collection unit network 166 and, therefore, each garbage collection unit in the processing environment 151 (e.g., garbage collection unit 155-1 and garbage collection unit 155-2 in this example embodiment) may send and receive data to one another via the logical pathway provided by garbage collection unit network 166. A garbage collection unit 155 has garbage collection responsibilities for objects residing in the memory 165 (e.g., DRAM) associated with the garbage collection unit's garbage collection boundary 152. For example, garbage collection unit 155-1 is responsible for objects residing in memory 165-1 (e.g., first garbage collection boundary 152-1), while garbage collection unit 155-2 is responsible for objects and object references residing in memory 165-2 (e.g., second garbage collection boundary).

One skilled in the art will appreciate that more than one level of cache may be suitable in such a processor environment (e.g., level 2 "L2" cache, and so on), and the implementation of multiple levels of system cache does not deviate from the scope of the invention. It should also be noted that the garbage collection units 155 may be instantiated in one or more components of the processor environment (e.g., processors, memory controllers, etc.) and are not necessarily limited to execution in the translators 159. Furthermore, the methods for object addressed memory and translation are augmented by techniques discussed in U.S. Pat. No. 6,859,868 entitled "OBJECT ADDRESSED MEMORY HIERARCHY", incorporated herein by reference.

Figure 2:
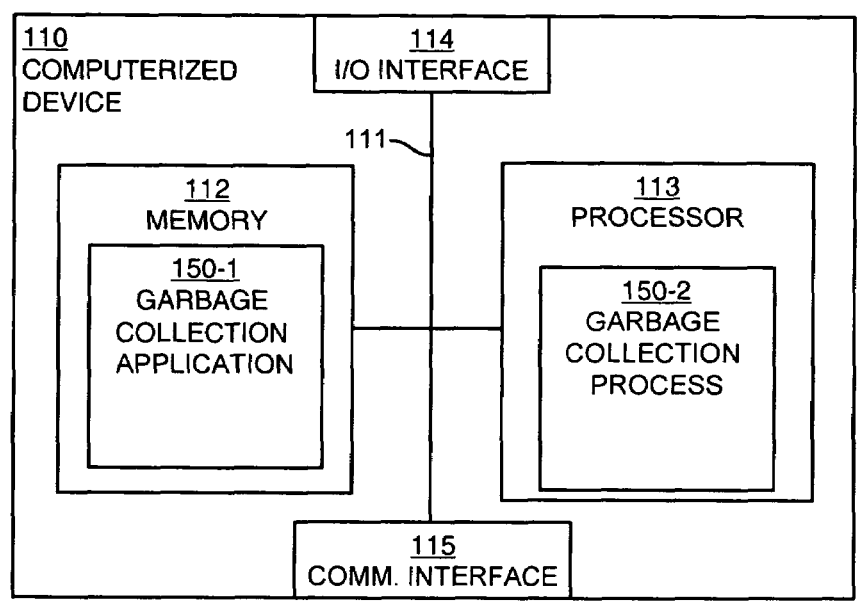
FIG. 2 is a block diagram of a computerized system configured with an application including a garbage collection process in accordance with one example configuration.

FIG. 2 is a block diagram illustrating an example architecture of a computerized device 110 that executes, runs, interprets, operates or otherwise performs a garbage collection application 150-1 and process 150-2. The computerized device 110 may be any type of computerized device such as a personal computer, workstation, portable computing device, console, laptop, network terminal or the like. As shown in this example, the computerized device 110 includes an interconnection mechanism 111 such as a data bus or other circuitry that couples a memory system 112, a processor 113 (e.g., having a plurality of processing cores), an input/output interface 114, and a communications interface 115. The communications interface 115 enables the computerized device 110 to communicate with other devices (i.e., other computers) on a network (not shown). This can allow access to the garbage collection application 150-1 by remote computer systems.

The memory system 112 is any type of computer readable medium and in this example is encoded with a garbage collection application 150-1. The garbage collection application 150-1 may be embodied as software code such as data and/or logic instructions (e.g., code stored in the memory or on another computer readable medium such as a removable disk) that supports processing functionality according to different embodiments described herein. During operation of the computerized device 110, the processor 113 accesses the memory system 112 via the interconnect 111 in order to launch, run, execute, interpret or otherwise perform the logic instructions of the garbage collection application 150-1. The garbage collection process 150-2 represents one or more portions of runtime instances of the garbage collection application 150-1 (or the entire application 150-1) performing or executing within or upon the processor 113 in the computerized device 110 at runtime.

Flow charts of the example embodiments presently disclosed methods are depicted in FIGS. 3 and 5-9. The rectangular elements are herein denoted "steps" and represent computer software instructions or groups of instructions. Alternatively, the steps are performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
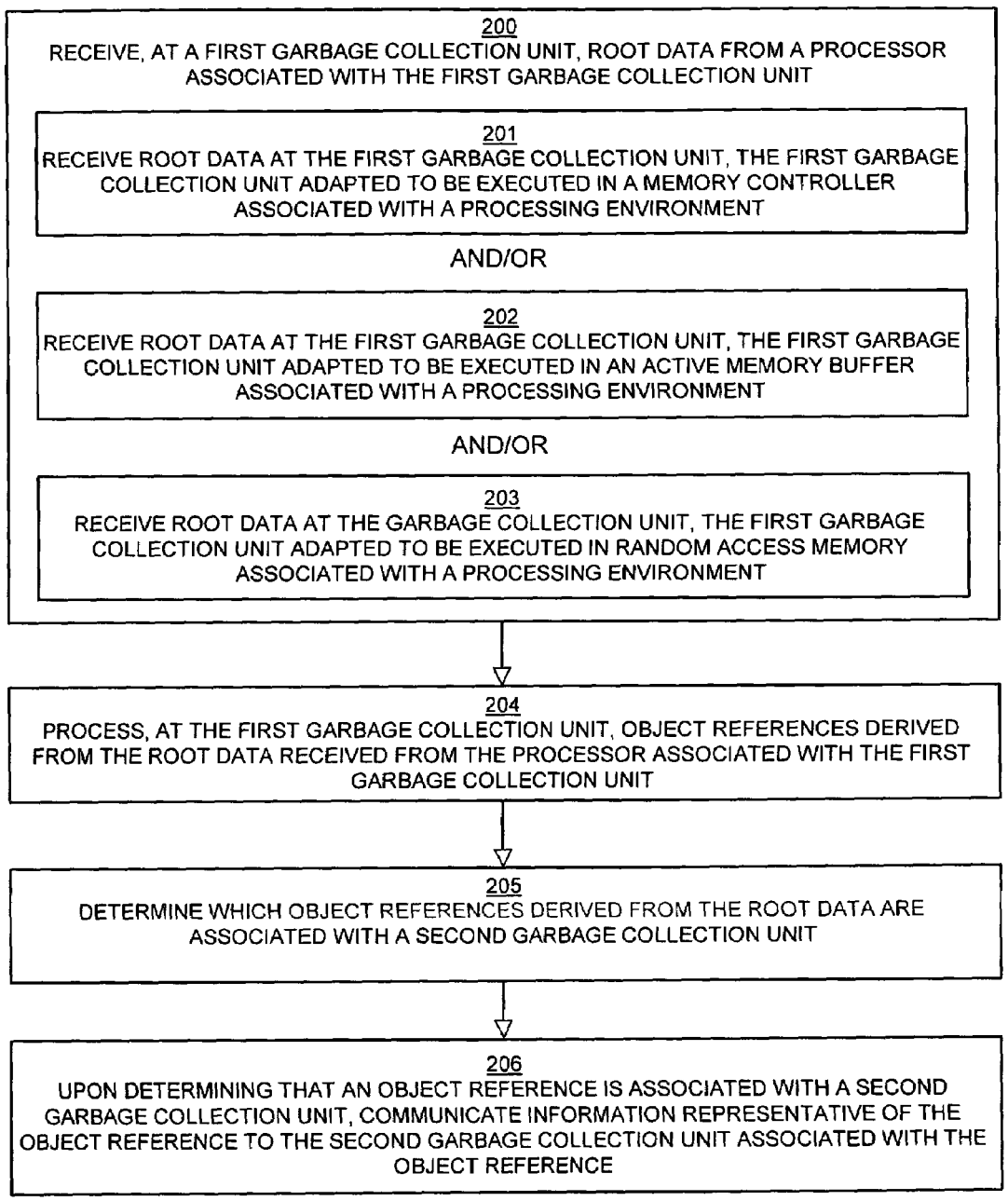
FIG. 3 is a flow chart of processing steps that shows high-level processing operations performed by the garbage collection process when it processes root data in accordance with one example embodiment.

FIG. 3 is a flow chart of processing steps that shows high-level processing operations performed by the garbage collection process when it processes root data in accordance with one example embodiment.

In step 200, the garbage collection process 150-2 receives, at a first garbage collection unit 155-1, root data from a processor 156-1 associated with the first garbage collection unit 155-1. As shown in the example configuration of FIG. 1, the processors 156 send root data (e.g., object ID's) associated with the mutator threads 154 executing in the processors 156 (e.g., from the respective stacks 157 and registers 158) to the garbage collection units 155.

In step 201, the garbage collection process 150-2 receives root data at the first garbage collection unit 155-1, wherein the first garbage collection unit 155-1 is adapted to be executed in a memory controller (not shown) associated with the processing environment 151. A garbage collection unit may be instantiated in full, or in part, in a memory controller.

In step 202, the garbage collection process 150-2 receives root data at the first garbage collection unit 155-1, wherein the first garbage collection unit 155-1 is adapted to be executed in an active memory buffer (not shown) associated with the processing environment 151. For example, in one embodiment the garbage collection unit 155 may be instantiated in an active memory buffer as part of a fully buffered dual in-line memory module (FB-DIMM). A garbage collection unit may be instantiated in full, or in part, as part of the switch fabric in an active memory buffer.

In step 203, the garbage collection process 150-2 receives root data at the first garbage collection unit 155-1, wherein the first garbage collection unit 155-1 is adapted to be executed in random access memory (e.g., system memory 165, DRAM, etc.) associated with the processing environment 151. A garbage collection unit may be instantiated in full, or in part, in random access memory.

In step 204, the garbage collection process 150-2 processes, at the first garbage collection unit 155-1, object references derived from the root data received from the processor 156-1 associated with the first garbage collection unit 155-1. The processing of the object references derived from the root data includes identifying references to other live objects which are transitively reachable from the root data in accordance with one example embodiment. Details of such processing are discussed further in the steps below.

In step 205, the garbage collection process 150-2 determines which object references derived from the root data are associated with a second garbage collection unit 155-2. Details of the garbage collection process 150-2 determining the garbage collection unit ownership of particular root data are discussed further in the steps below.

In step 206, upon determining that an object reference is associated with a second garbage collection unit 155-2, the garbage collection process 150-2 communicates information representative of the object reference to the second garbage collection unit 155-2 associated with the object reference. As shown in the example configuration of FIG. 1, the garbage collection process 150-2 communicates object reference information between garbage collection units 155 via garbage collection unit network 166.

Figure 4:
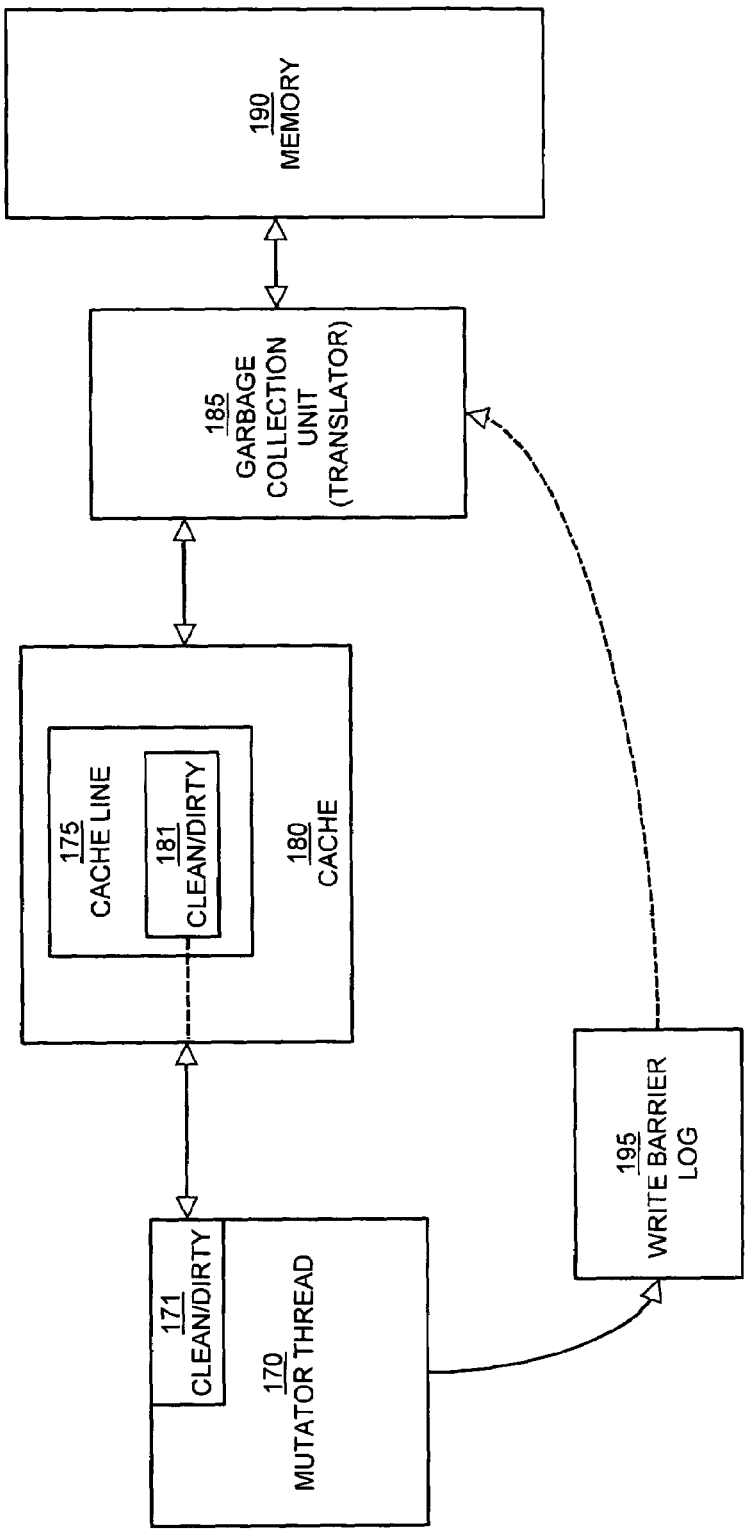
FIG. 4 is a block diagram depicting the activation of a read and write barrier during a garbage collection cycle in accordance with one example configuration.

FIG. 4 is a block diagram depicting the activation of a read barrier in processing environment 151 in accordance with one example embodiment. As shown in FIG. 4, mutator thread 170 is in communication with cache 180 via cache line 175. Mutator thread 170 has a state bit 171 which may be set as either 'dirty' or 'clean'. Likewise, each cache line (e.g., cache line 175) of cache 180 has a state bit (e.g., state bit 181) that may also be set as either 'dirty' or 'clean'. Additionally, as shown in the example embodiment of FIG. 5, the cache 180 is in communication with memory 190 via garbage collection unit 185 (e.g., the translator).

Figure 5:
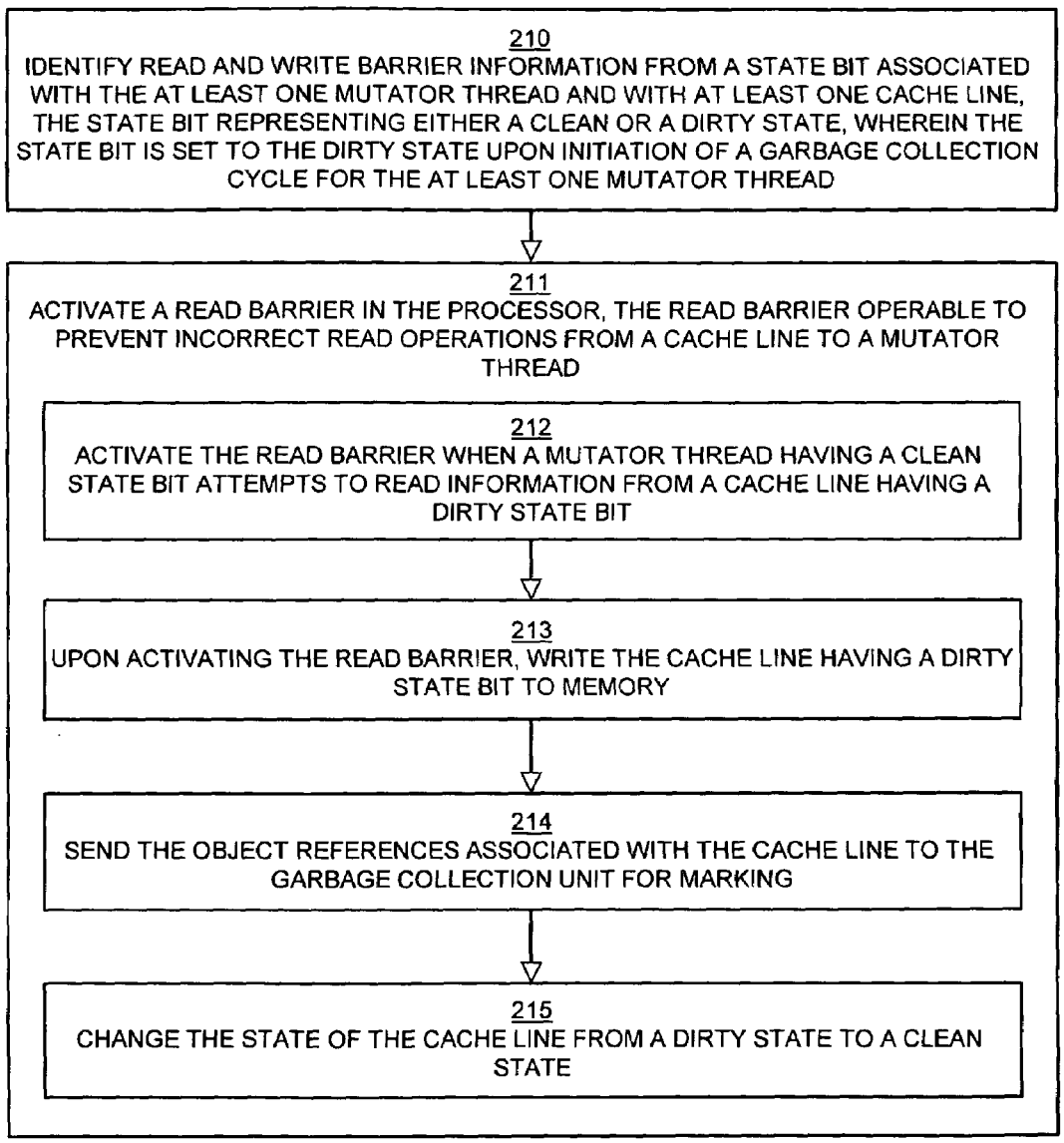
FIG. 5 is a flow chart of processing steps that shows high-level processing operations performed by the garbage collection process while the garbage collection process is processing root data and identifying live objects in accordance with one example embodiment.

FIG. 5 is a flow chart of processing steps that shows high-level processing operations performed by the garbage collection process while the garbage collection process is processing root data and identifying live objects in accordance with one example embodiment.

In step 210, the garbage collection process 150-2 identifies read and write barrier information from a state bit 171, 181 associated with at least one mutator thread 170 and with at least one cache line 175. In accordance with one example embodiment, the state bit 171, 181 represents either a clean or a dirty state, wherein the state bit 171, 181 is set to the dirty state upon initiation of a garbage collection cycle for each mutator thread 170. Generally, as in one example embodiment, a garbage collection cycle for a particular garbage collection unit is initiated by the processor 156 associated with the respective garbage collection unit.

In step 211, the garbage collection process 150-2 activates a read barrier in the processor 156-1 during the traversal of the live objects at the first garbage collection unit 155-1. The read barrier is operable to prevent incorrect read operations from a cache line 175 to a mutator thread 170.

In step 212, the garbage collection process 150-2 activates the read barrier when a mutator thread 154 having a clean state bit 171 attempts to read information from a cache line 175 having a dirty state bit 181. For example, in FIG. 5 the read barrier is activated when mutator thread 154 (having a 'dirty' state bit 171) attempts to read data from the cache line 175 (having a 'clean' state bit 181). As previously discussed, the read barrier prevents incorrect read operations from a 'dirty' cache line to a 'clean' mutator thread 154 and, thus, preserves the 'clean' status of the mutator thread 154.

In step 213, upon activating the read barrier, the garbage collection process 150-2 writes the cache line having a dirty state bit to memory. For instance, in the example embodiment shown in FIG. 5 the garbage collection process 150-2 writes cache line 175 (having a 'dirty' state bit 181) to memory 190. By writing the dirty cache line 175 to memory, the garbage collection unit 'cleans' the cache line 175.

In step 214, the garbage collection process 150-2 sends the object references associated with the cache line 175 to the garbage collection unit 180 for processing. The marking processing may be any garbage collection marking algorithm commonly known in the art such as mark and sweep, and the like. Generally, the marking of live objects terminates when there are no more object references to be processed.

In step 215, the garbage collection process 150-2 changes the state of the cache line from a dirty state to a clean state. For example, the garbage collection unit 150-2 changes the state bit 181 of cache line 175 from the 'dirty' state to a 'clean' state after the contents of the cache line 175 are sent to the garbage collection unit 185 for processing.

In some instances, an object reference can remain in the processor cache 160 indefinitely and, consequently, will not be seen by the marking process if those object references never reach the translator 159. Thus, dirty cache lines should be written back to memory 165 at least once during each garbage collection cycle. In one example embodiment, an autonomous engine in the cache 160 periodically writes back dirty cache lines and makes those cache lines clean. In another example embodiment, by using directory information existing in memory 165 (e.g., DRAM), the translator 159 (e.g., garbage collector 155) emits coherence requests (backwards, from memory 165 to the processor 156) should it try to construct an object cache line for marking which exists (or may exist) in the caches 160.

Figure 6:
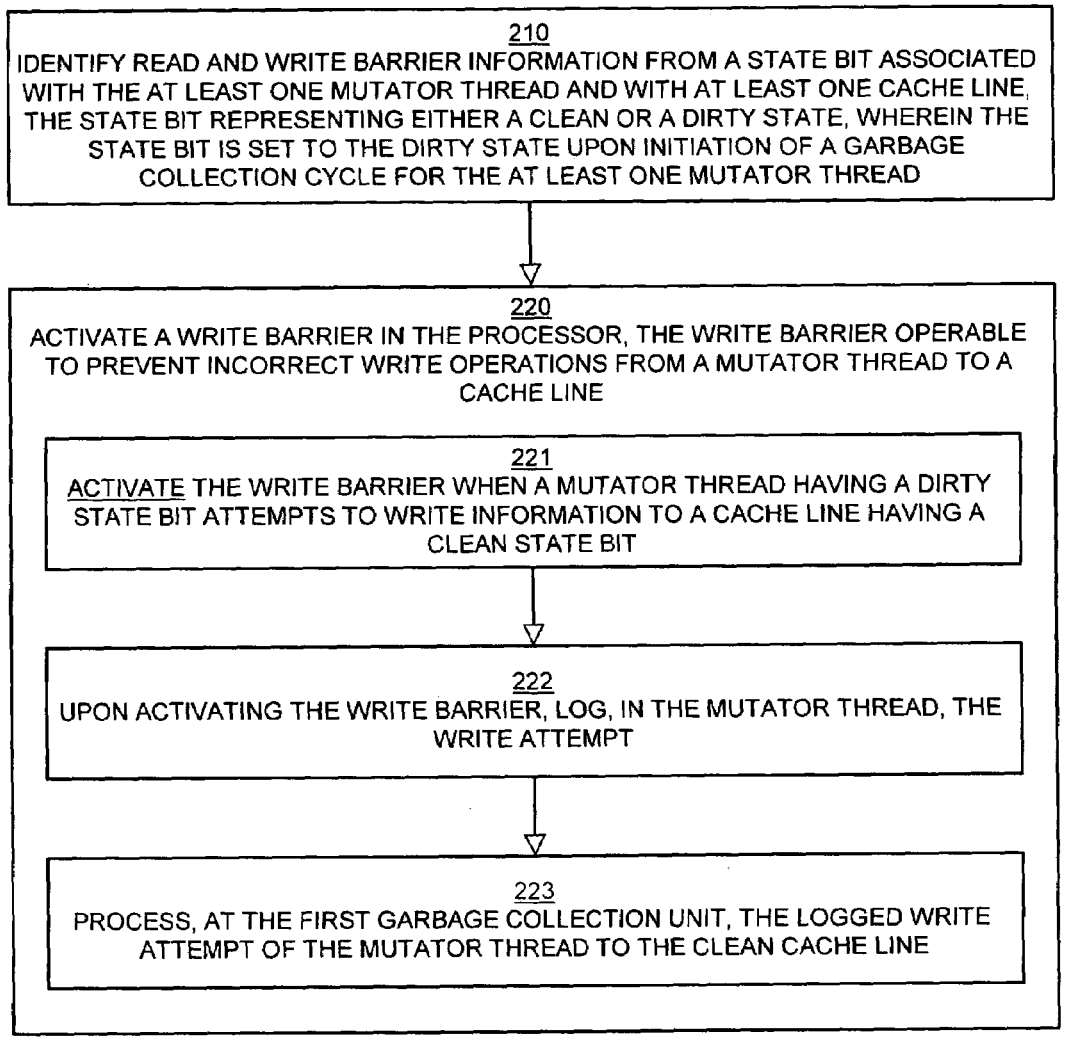
FIG. 6 is a flow chart of processing steps that shows high-level processing operations performed by the garbage collection process while the garbage collection process is processing root data and identifying live objects in accordance with one example embodiment.

FIG. 6 is a flow chart of processing steps that shows high-level processing operations performed by the garbage collection process while the garbage collection process is processing root data and identifying live objects in accordance with one example embodiment.

In step 210, the garbage collection process 150-2 identifies read and write barrier information from a state bit 171, 181 associated with at least one mutator thread 170 and with at least one cache line 175. In accordance with one example embodiment, the state bit 171, 181 represents either a clean or a dirty state, wherein the state bit 171, 181 is set to the dirty state upon initiation of a garbage collection cycle for each mutator thread 170. Generally, as in one example embodiment, a garbage collection cycle for a particular garbage collection unit is initiated by the processor 156 associated with the respective garbage collection unit.

In step 220, the garbage collection process 150-2 activates a write barrier in the processor 156. The write barrier is operable to prevent incorrect write operations from a mutator thread 170 to a cache line 175.

In step 221, the garbage collection process 150-2 activates the write barrier when a mutator thread 170 having a dirty state bit 171 attempts to write information to a cache line 175 having a clean state bit 181. As shown in the example configuration of FIG. 5, the garbage collection process 150-2 activates a write barrier when mutator thread 170 (having a 'dirty' state bit 171) attempts to write data to cache line 175 (having a 'clean' state bit 181). As such, the write barrier prevents incorrect write operations from dirty mutator threads to clean cache lines so as to preserve the 'clean' status of the cache line 175.

In step 222, upon activating the write barrier, the garbage collection process 150-2 logs (e.g., records), in the mutator thread, the write attempt. FIG. 5 shows an example embodiment whereby the mutator thread 170 logs information associated with the incorrect write attempt to a write barrier log 195.

In step 223, the garbage collection process 150-2 processes, at the garbage collection unit 185, the logged write attempt 195 of the mutator thread 170 (having a dirty state bit 171) to the clean cache line 175. The write barrier log 195 maintains information necessary for future processing of the incorrect write operation either during or after the garbage collection cycle.

Figure 7:
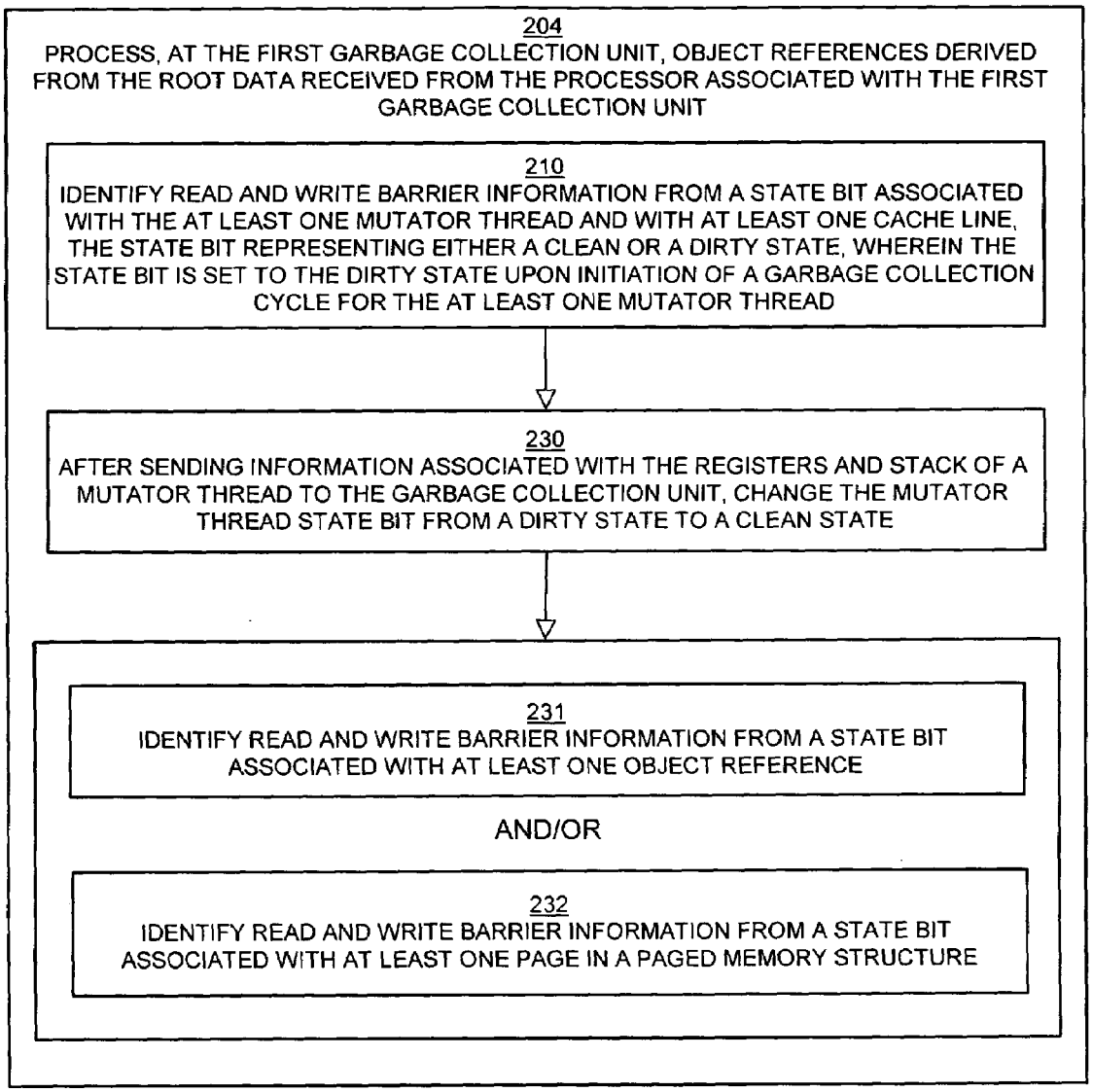
FIG. 7 is a flow chart of processing steps that shows high-level processing operations performed by the garbage collection process while the garbage collection process is processing root data and identifying live objects in accordance with one example embodiment.

FIG. 7 is a flow chart of processing steps that shows high-level processing operations performed by the garbage collection process while the garbage collection process is processing root data and identifying live objects in accordance with one example embodiment.

In step 204, the garbage collection process 150-2 processes, at the first garbage collection unit 155-1, object references derived from the root data received from the processor 156-1 associated with the first garbage collection unit 155-1. Details of such processing are discussed further in the steps below.

In step 210, the garbage collection process 150-2 identifies read and write barrier information from a state bit 171, 181 associated with at least one mutator thread 170 and with at least one cache line 175. In accordance with one example embodiment, the state bit 171, 181 represents either a clean or a dirty state, wherein the state bit 171, 181 is set to the dirty state upon initiation of a garbage collection cycle for each mutator thread 170. Generally, as in one example embodiment, a garbage collection cycle for a particular garbage collection unit is initiated by the processor 156 associated with the respective garbage collection unit.

In step 230, after sending information associated with the registers 157 and stack 158 of a mutator thread 154 to the garbage collection unit 155, the garbage collection process 150-2 changes the mutator thread state bit 171 from a dirty state to a clean state. In other words, the mutator thread 154 is considered to be 'clean' after submitting the requisite root data (from the corresponding registers 157 and stack 158 of the processor 156) to the garbage collection unit 155.

In step 231, the garbage collection process 150-2 identifies read and write barrier information from a state bit associated with at least one object reference in accordance with one example embodiment. As an alternative to having a state bit associated with a cache line, in one example embodiment each object reference has a state bit (set to either clean or dirty) used by the garbage collection process 150-2 (in conjunction with the mutator thread state bit 171) in determining whether to activate a read and/or write barrier with respect to a mutator thread 154.

In step 232, the garbage collection process 150-2 identifies read and write barrier information from a state bit associated with at least one page in a paged memory structure in accordance with one example embodiment. As an alternative to having a state bit associated with a cache line or object reference, in one embodiment each page in a paged memory system has a state bit (set to either clean or dirty) used by the garbage collection process 150-2 (in conjunction with the mutator thread state bit 171) in determining whether to activate a read and/or write barrier with respect to a mutator thread 154.

Figure 8:
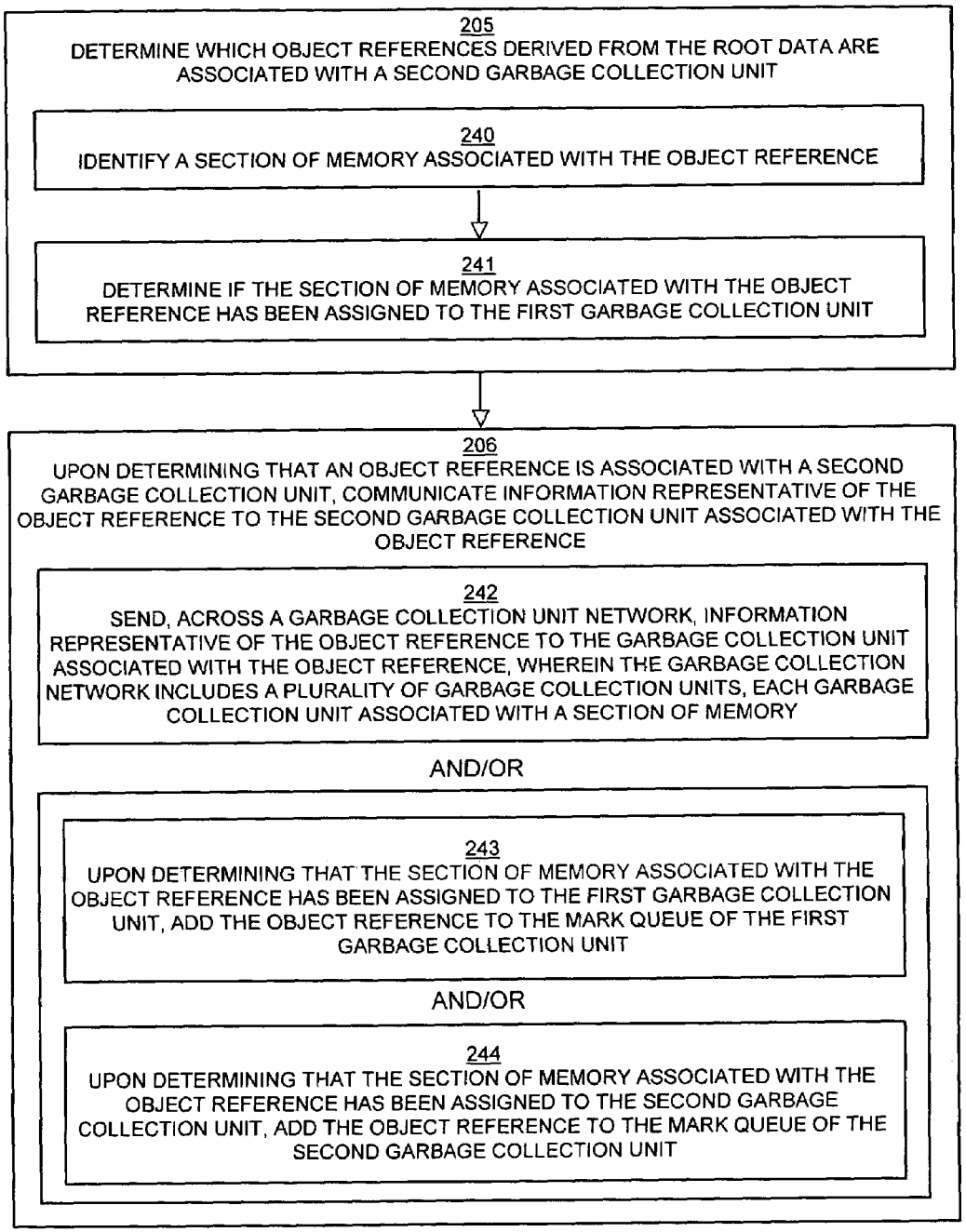
FIG. 8 is a flow chart of processing steps that shows high-level processing operations performed by the garbage collection process when it determines object reference associations with sections of memory in accordance with one example embodiment.

FIG. 8 is a flow chart of processing steps that shows high-level processing operations performed by the garbage collection process when it determines object reference associations with sections of memory in accordance with one example embodiment.

In step 205, the garbage collection process 150-2 determines which object references derived from the root data are associated with a second garbage collection unit 155-2. Details of the garbage collection process 150-2 determining the garbage collection unit ownership of particular root data are discussed further in the steps below.

In step 240, the garbage collection process 150-2 identifies a section of memory associated with an object reference. Referring to the example configuration of FIG. 1, the garbage collection process 150-2 (in garbage collection unit 155-1) has identified a first object 169-1 (e.g., from the root data set received from processor 156-1) that resides in memory 165-1. In processing the first object 169, the garbage collection process 150-2 identifies, within the first object 169-1, a reference to a second object 169-2 that resides in memory 165-2 (e.g., "OBJ REF-2" shown in FIG. 1).

In step 241, the garbage collection process 150-2 determines if the section of memory associated with the object reference has been assigned to the first garbage collection unit 155-1. For example, as shown in FIG. 1, the garbage collection process 150-2 determines that the second object 169-2 resides in memory 165-2 associated with a separate garbage collection boundary (e.g., second garbage collection boundary 152-2) than the first garbage collection unit 155-1 (located in the first garbage collection boundary 152-1).

In step 206, upon determining that an object reference is associated with a second garbage collection unit 155-2, the garbage collection process 150-2 communicates information representative of the object reference to the second garbage collection unit 155-2 associated with the object reference. As shown in the example configuration of FIG. 1, the garbage collection process 150-2 communicates object reference information between garbage collection units 155 via garbage collection unit network 166.

In step 242, the garbage collection process 150-2 sends, across a garbage collection unit network 166, information representative of the object reference to the garbage collection unit 155 associated with the object reference. As per one example embodiment, the garbage collection network 166 includes a plurality of garbage collection units 155, wherein each garbage collection unit 155 is associated with a section of memory. In accordance with example embodiments, a garbage collection unit may be associated with a single memory device, multiple memory devices and/or only a section of a memory device.

In step 243, upon determining that the section of memory associated with the object reference has been assigned to the first garbage collection unit 155-1, the garbage collection process 150-2 adds the object reference to the mark queue 167-1 of the first garbage collection unit 155-1. Since the first object 169-1 resides in memory 165-1 assigned to the first garbage collection unit 155-1 (e.g., first object 169-1 resides in the first garbage collection boundary 152-1), the garbage collection process 150-2 adds the first object 169-1 to the mark queue 167-1 of the first garbage collection unit 155-1 for further garbage collection processing (e.g., mark and sweep processing and/or other garbage collection processing generally known in the art).

In step 244, upon determining that the section of memory associated with the object reference has been assigned to the second garbage collection unit 155-2, the garbage collection process 150-2 adds the object reference to the mark queue 167-2 of the second garbage collection unit 155-2. Since the second object 169-2 resides in memory 165-2 assigned to the second garbage collection unit 155-2 (e.g., second object 169-2 resides in the second garbage collection boundary 152-2), the garbage collection process 150-2 adds the second object 169-2 to the mark queue of the second garbage collection unit 155-2 for further garbage collection processing (e.g., mark and sweep processing). The second garbage collection unit 155-2 processes object references received from the first garbage collection unit 155-1 as it would process other object references derived from the root data associated with the second garbage collection unit 155-2. In one example embodiment, the garbage collection process 150-2 adds the second object 169-2 to the mark queue 167-2 of the second garbage collection unit 155-2 by sending information associated with the second object 169-2 from the first garbage collection unit 155-1 across the garbage collection unit network 166 to the second garbage collection unit 155-2.

FIG. 9 is a flow chart of processing steps that shows high-level processing operations performed by the garbage collection process while the garbage collection process is processing root data and identifying live objects in accordance with one example embodiment.

In step 204, the garbage collection process 150-2 processes, at the first garbage collection unit 155-1, object references derived from the root data received from the processor 156-1 associated with the first garbage collection unit 155-1. Details of such processing are discussed further in the steps below.

In step 250, the garbage collection process 150-2 identifies object references within an object using a bifurcated data structure. In one example embodiment, the bifurcated data structure is configured such that the object header data is approximately located in the middle of the object data structure, object reference data are located at negative offsets to the object header data, and non-reference data are located at positive offsets to the object header data. The methods for processing bifurcated object data structures are augmented by techniques discussed in U.S. Pat. No. 5,900,001 entitled "METHODS AND APPARATUS FOR OPTIMIZING EXACT GARBAGE COLLECTION USING A BIFURCATED DATA STRUCTURE", incorporated herein by reference.

In step 251, the garbage collection process 150-2 identifies object references within an object using a bifurcated data structure. In this example embodiment, the bifurcated data structure is configured such that the object header data is approximately located in the middle of the object data structure, object reference data are located at positive offsets to the object header data, and non-reference data are located at negative offsets to the object header data.

In step 252, the garbage collection process 150-2 identifies object references within an object using a tagged memory data structure. In example embodiments, the tagged memory data structure may be used in lieu of, or in conjunction with the bifurcated data structure for locating, marking and processing objects as described above.

In step 253, the garbage collection process 150-2 derives, from each object reference, further object references by identifying those object references within the contents of the referenced objects.

Those skilled in the art should readily appreciate that the programs and methods for garbage collection in a processing environment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for garbage collection in a processing environment has been particularly shown and described with references to embodiments thereof, it will be understood by those skilled in the art that various changes in form and details may be made therein without departing from the scope of the invention encompassed by the appended claims.

What we claim is:

1. A method for garbage collection in an object-based memory system, the object-based memory system associated with a processing environment that executes at least one mutator program, each mutator program having at least one corresponding mutator thread, the method comprising:

receiving, at a first garbage collection unit, root data from a processor associated with the first garbage collection unit;

processing, at the first garbage collection unit, object references derived from the root data received from the processor associated with the first garbage collection unit including identifying read and write barrier information from a state bit associated with the at least one mutator thread and with at least one cache line, the state bit representing either a clean or a dirty state, wherein the state bit is set to the dirty state upon initiation of a garbage collection cycle for the at least one mutator thread;

determining which object references derived from the root data are associated with a second garbage collection unit;

upon determining that an object reference is associated with the second garbage collection unit, communicating information representative of the object reference to the second garbage collection unit associated with the object reference; and activating a read barrier in the processor, the read barrier operable to prevent incorrect read operations from a cache line to a mutator thread.

2. The method of claim 1 wherein activating a read barrier in the processor comprises activating the read barrier when a mutator thread having a clean state bit attempts to read information from a cache line having a dirty state bit.

3. The method of claim 2 further comprising:

upon activating the read barrier, writing the cache line having a dirty state bit to memory;

sending object references associated with the cache line to one of the garbage collection units for processing; and changing state of the cache line from a dirty state to a clean state.

4. The method of claim 1 further comprising:

activating a write barrier in the processor, the write barrier operable to prevent incorrect write operations from a mutator thread to a cache line.

5. The method of claim 4 wherein activating a write barrier in the processor comprises activating the write barrier when a mutator thread having a dirty state bit attempts to write information to a cache line having a clean state bit.

6. The method of claim 5 further comprising:

upon activating the write barrier, logging, in the mutator thread, the write attempt; and processing, at the first garbage collection unit, the logged write attempt of the mutator thread to the clean cache line.

7. The method of claim 1 further comprising:

after sending information associated with registers and stack of a mutator thread to one of the garbage collection units, changing the state bit from a dirty state to a clean state.

8. The method of claim 1 wherein determining which object references derived from the root data are associated with a second garbage collection unit comprises identifying a section of memory associated with the object reference; determining if the section of memory associated with the object reference has been assigned to the first garbage collection unit; and wherein communicating information representative of the object reference to the second garbage collection unit associated with the object reference comprises at least one of upon determining that the section of memory associated with the object reference has been assigned to the first garbage collection unit, adding the object reference to a mark queue of the first garbage collection unit; and upon determining that the section of memory associated with the object reference has been assigned to the second garbage collection unit, adding the object reference to a mark queue of the second garbage collection unit.

9. The method of claim 1 wherein the communicating information representative of the object reference to the second garbage collection unit associated with the object reference comprises sending, across a garbage collection unit network, information representative of the object reference to the garbage collection unit associated with the object reference, wherein the garbage collection network includes a plurality of garbage collection units, each garbage collection unit associated with a section of memory.

10. The method of claim 1 further comprising at least one of identifying read and write barrier information from a state bit associated with at least one object reference; and identifying read and write barrier information from a state bit associated with at least one page in a paged memory structure.

11. The method of claim 1 wherein processing, at the first garbage collection unit, object references derived from the root data received from the processor associated with the first garbage collection unit comprises at least one of identifying object references within an object using a bifurcated data structure, wherein header data is approximately located in a middle of the object, object reference data are located at negative offsets to the header data, and non-reference data are located at positive offsets to the header data;

identifying object references within an object using a bifurcated data structure, wherein header data is approximately located in a middle of the object, object reference data are located at positive offsets to the header data, and non-reference data are located at negative offsets to the header data;

identifying object references within an object using a tagged memory data structure; and from each object reference, deriving further object references by identifying object references within contents of the referenced objects.

12. The method of claim 1 wherein receiving, at a first garbage collection unit, root data from a processor associated with the first garbage collection unit comprises at least one of receiving root data at the first garbage collection unit, the first garbage collection unit adapted to be executed in a memory controller associated with the processing environment;

receiving root data at the first garbage collection unit, the first garbage collection unit adapted to be executed in an active memory buffer associated with the processing environment; and receiving root data at the first garbage collection unit, the first garbage collection unit adapted to be executed in random access memory associated with the processing environment.

13. A computerized device comprising:

at least one memory;

a processor;

at least one cache memory device;

at least one garbage collection unit;

a communications interface;

an interconnection mechanism coupling the at least one memory, the at least one cache memory device, the processor, the communications interface and the at least one garbage collection unit; and wherein the at least one garbage collection unit is encoded with a garbage collection application that when executed in the at least one garbage collection unit provides a garbage collection process causing the computerized device to be capable of performing operations of receiving, at a first garbage collection unit of the at least one garbage collection unit, root data from a processor associated with the first garbage collection unit;

processing, at the first garbage collection unit, object references derived from the root data received from the processor associated with the first garbage collection unit including identifying read and write barrier information from a state bit associated with the at least one mutator thread and with at least one cache line, the state bit representing either a clean or a dirty state, wherein the state bit is set to the dirty state upon initiation of a garbage collection cycle for the at least one mutator thread;

determining which object references derived from the root data are associated with a second garbage collection unit of the at least one garbage collection unit;

upon determining that an object reference is associated with the second garbage collection unit, communicating information representative of the object reference to the second garbage collection unit associated with the object reference; and activating a write barrier in the processor, the write barrier operable to prevent incorrect write operations from a mutator thread to a cache line.

14. The computerized device of claim 13 further comprising:

activating a read barrier in the processor, the read barrier operable to prevent incorrect read operations from a cache line to a mutator thread; and wherein activating a read barrier in the processor comprises activating the read barrier when a mutator thread having a clean state bit attempts to read information from a cache line having a dirty state bit;

upon activating the read barrier, writing the cache line having a dirty state bit to memory;

sending the object references associated with the cache line to the at least one garbage collection unit for processing; and changing state of the cache line from a dirty state to a clean state.

15. The computerized device of claim 14 further comprising:

wherein activating a write barrier in the processor comprises activating the write barrier when a mutator thread having a dirty state bit attempts to write information to a cache line having a clean state bit;

upon activating the write barrier, logging, in the mutator thread, the write attempt; and processing, at the first garbage collection unit, the logged write attempt of the mutator thread to the clean cache line; and after sending information associated with registers and stack of the mutator thread to the at least one garbage collection unit, changing the state bit from a dirty state to a clean state.

16. The computerized device of claim 14 wherein determining which object references derived from the root data are associated with a separate garbage collection unit comprises identifying a section of memory associated with the object reference;

determining if the section of memory associated with the object reference has been assigned to the first garbage collection unit; and wherein communicating information representative of the object reference to the second garbage collection unit associated with the object reference comprises at least one of upon determining that the section of memory associated with the object reference has been assigned to the first garbage collection unit, adding the object reference to a mark queue of the first garbage collection unit; and upon determining that the section of memory associated with the object reference has been assigned to the second garbage collection unit, adding the object reference to a mark queue of the second garbage collection unit.

17. A computer program product having a non-transitory computer readable storage medium operable to store computer program logic embodied in computer program code encoded thereon as an encoded set of processor based instructions for performing garbage collection comprising:

computer program code for receiving, at a first garbage collection unit, root data from a processor associated with the first garbage collection unit;

computer program code for processing, at the first garbage collection unit, object references derived from the root data received from the processor associated with the first garbage collection unit including identifying read and write barrier information from a state bit associated with the at least one mutator thread and with at least one cache line, the state bit representing either a clean or a dirty state, wherein the state bit is set to the dirty state upon initiation of a garbage collection cycle for the at least one mutator thread;

computer program code for determining which object references derived from the root data are associated with a second garbage collection unit;

upon determining that an object reference is associated with the second garbage collection unit, computer program code for communicating information representative of the object reference to the second garbage collection unit associated with the object reference; and activating a read barrier in the processor, the read barrier operable to prevent incorrect read operations from a cache line to a mutator thread.

18. The computer program product of claim 17 wherein the computer program code for communicating information representative of the object reference to the second garbage collection unit associated with the object reference comprises computer program code for sending, across a garbage collection unit network, information representative of the object reference to the garbage collection unit associated with the object reference, wherein the garbage collection network includes a plurality of garbage collection units, each garbage collection unit associated with a section of memory.

* * * * *

UNITED STATES PATENT AND TRADEMARK OFFICE
CERTIFICATE OF CORRECTION

PATENT NO.        : 8,825,718 B2              Page 1 of 1
APPLICATION NO.   : 11/648135
DATED             : September 2, 2014
INVENTOR(S)       : Wolczko et al.

It is certified that error appears in the above-identified patent and that said Letters Patent is hereby corrected as shown below:

In the Specification

Column 1, line 29, delete "in between" and insert -- in-between --, therefor.

Signed and Sealed this
Fourteenth Day of July, 2015

Michelle K. Lee
*Director of the United States Patent and Trademark Office*